June 23, 1936.  L. S. HARBER ET AL  2,045,228
MANUFACTURE OF BREAD
Filed April 20, 1933
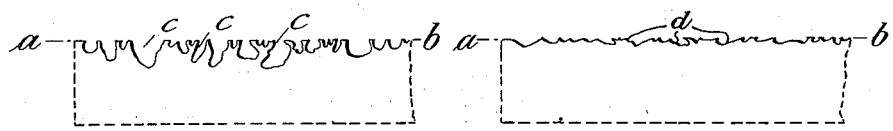
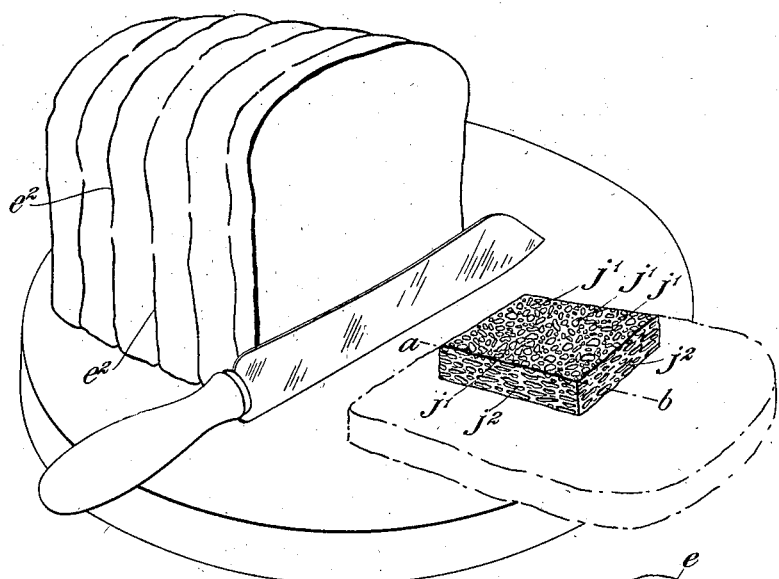
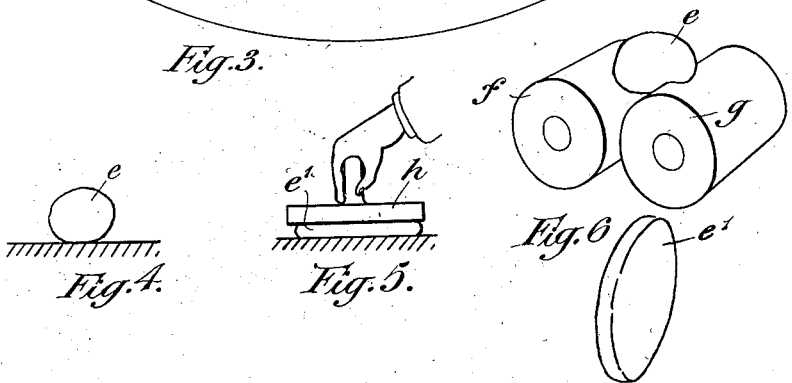
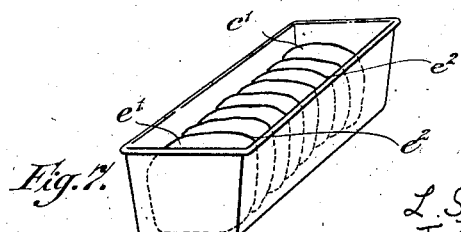
L. S. Harber
J. E. Pointon
INVENTORS Patented June 23, 1936

2,045,228

UNITED STATES PATENT OFFICE 2,045,228

MANUFACTURE OF BREAD

Laurence Seymour Harber and John Edward Pointon, Peterborough, England, assignors, by mesne assignments, to Baker Perkins Company Incorporated, Saginaw, Mich., a corporation of New York Application April 20, 1933, Serial No. 667,076
In Great Britain April 22, 1932

6 Claims. (Cl. 107—54)

This invention relates to the manufacture of tin bread and has more particular reference to the treatment and formation of the dough for baking.

According to the usual processes for the manufacture of tin bread the cellular structure of the baked loaf is either entirely irregular and the cells have no common characteristic shape or arrangement, or if there be any tendency towards uniformity in the cellular structure it appears to be such that the cells have irregular elongated shapes and lie more or less in the direction of the length of the loaf. This kind of cellular structure of an ordinary loaf is diagrammatically illustrated by way of example in Figure 1 of the accompanying drawing. This diagram represents the surface edge a—b of a slice produced by cutting transversely of the length of the loaf and cutting again across the slice, this latter cut being as represented by the plane of the paper. The cells c have their longer axes more or less normal to the surface edge a—b as displayed by the section and form deep cavities which break up the plane of the surface exposed by the transverse cut of the loaf.

In a tin loaf this kind of cellular structure or arrangement appears throughout the main body of the loaf while at the ends thereof the cells may be flattened in planes lying more or less transversely of the longitudinal axis of the loaf, due probably to the confining and reactive pressure effect of the adjacent end of the tin. Moreover, at or about the mid portion of the loaf the cellular structure is usually more coarse or open while towards the end it tends to become more compact and denser. One of the results of this cell structure is that the loaf when cut transversely in the usual way, affords sections which vary according to the position of the cut longitudinally of the loaf. Thus, a transverse cut taken in the mid portion of the loaf exposes a surface which Figure 1 may be taken to exemplify and which has a darkened appearance owing to the fact that the cells in this position present more or less deep open cavities while a section cut close to the end of the loaf presents a lighter surface as the cavities, due to the form of the cells and the way they lie with respect to the cut surface, are shallower.

The object of the present invention is to provide an improved treatment of dough in the manufacture of tin bread whereby the baked loaf will have an interal structure which is consistent throughout the loaf possessing improved characteristics (including colour, texture and crumb as disclosed when the loaf is cut transversely to the longitudinal axis) while at the same time the keeping qualities and flavour of the loaf are enhanced.

The invention consists in subjecting dough to a flattening operation, forming from the flattened dough a laminated body in the baking tin with vertical laminæ substantially at right-angles to the longitudinal axis of the tin, and proving and baking the composite dough piece in the tin so that a loaf is produced having the cellular structure hereinafter described.

It is preferred to subject the dough to a handing up or moulding operation before flattening in order to seal the dough surface. For example, a series of small pieces of dough are handed up (preferably by balling or rounding) to produce a skin or sealing surface around each piece. The balls thus formed are flattened to disc shape and assembled or stacked on edge in the tin for proving and baking.

A cellular structure is produced by the treatment according to the invention such that when the loaf is cut transversely to its longitudinal axis the cut surface exposes cells which are mainly of lenticular or beanlike shape with their longer axes or dimensions lying in planes approximately at right-angles to the longitudinal axis of the loaf. It will be understood that this definition of the cellular structure is not intended to be geometrically accurate but indicates rather the general character of the cell structure.

According to a feature of the invention the dough is handed up to seal the dough surface and then subjected to flattening or a stretching operation in directions transverse or radial to what will be its longitudinal axis when in the tin with a view to producing a vertically laminated body like a concertina or discs on edge in the baking tin. For example, a series of small pieces of dough are handed up (preferably by rounding) to produce a skin or sealing surface around each piece. The cylinders or balls thus formed are flattened and assembled or stacked on edge in the tin for proving and baking.

A feature of the invention lies in proving the dough in the tin so that the development of the cellular structure is localized or confined longitudinally of the tin between a series of transverse skins or stretched surfaces (formed in the handing up and treating of the dough prior to its deposit in the tin) in planes substantially at right-angles to the longitudinal axis of the tin.

In the accompanying drawing:—

Fig. 1 is a diagrammatic view showing the cellular structure of the surface edge of a slice cut from a common loaf, the cut being made transversely of the length of the loaf and again across the slice.

Fig. 2 is a similar view of a slice from a loaf according to the invention.

Fig. 3 is a perspective view of a loaf of bread according to the invention illustrating the manner in which the cuts shown in Figs. 1 and 2 are produced.

Fig. 4 is an elevation of a rounded dough piece.

Fig. 5 illustrates a mode of flattening the dough piece by a flattening tool.

Fig. 6 illustrates the use of gauge rolls for flattening the rounded dough piece.

Fig. 7 illustrates several of the flattened pieces assembled in a tin.

Referring to the drawing in detail,

Figure 2 is a diagram of the surface edge $a$—$b$ (see Figure 3) of a piece cut from a loaf according to the invention and is a similar view to Figure 1 of a like cut from an ordinary loaf with which it is compared. In Fig. 2 it will be seen that the cells $d$ as displayed at the surface edge $a$—$b$ are relatively shallow and afford a relatively continuous and less deeply broken surface as would be expected in a section taken of lenticular or bean-like cells taken substantially parallel to their longer axes as distinct from a section taken of deep cells (see Figure 1) or of cells of elongated tubular form.

In carrying the invention into effect according to one convenient mode, a series of dough pieces of equal weight are divided from a mass of dough proved in the usual way. The number of pieces in a series will depend upon the number of selected or predetermined laminae of which the loaf is to be composed. For example, for forming a 2 lb. loaf a series of ten pieces each 1/5th lb. are divided. While ten pieces are referred to it is to be understood that more may be chosen or a lesser number (as few as three or four) may be employed. The greater the number of pieces within practical limits the more pronounced will be the characteristic cellular structure in the loaf.

The small divided pieces are handed up by a rounding or balling action. After rounding the pieces may be proved for a short period to allow of recovery, but this is not essential. The rounded pieces (such as the example $e$ shown in Figure 4) are then flattened in any suitable manner such as by sheeting as exemplified by diagram Figure 6 by passing the balls $e$ vertically through a pair of gauge rolls $f$, $g$. After passing through the rolls the balls are delivered as discs $e'$. Instead of employing gauge rolls for flattening, the pieces $e$ may be flattened by pressing or pinning them with a flattening tool $h$ as shown in Figure 5, where a ball $e$ has been flattened and stretched into a disc $e'$ upon a table or suitable support. The flattened pieces are then assembled or stacked together on edge at right-angles to the longitudinal axis of the intended loaf, either directly in the tin $i$ as seen in the perspective view, Figure 7, or in a supplementary tray or holder from which they are subsequently placed or slid into the tin. The stacked pieces together form a composite dough piece which is subjected to a suitable period of proof in the usual manner in the baking tin and subsequently baked according to known practice in any of the usual types of oven. The baking tins may be of any of the known kinds which are rectangular in plan and may be of the open or lidded variety.

Instead of dividing the series of pieces in the first instance, a 2-lb. dough piece (or other suitable weight) may be divided from the mass, and this piece is subsequently handed up in a series of balls or otherwise to form a laminated or layer-like body.

It is important in order to secure a smooth exterior on the baked loaf that the preliminary treatment of the dough should be such that the dough pieces or portions when in the tin should be entirely covered by a skin or sealed surface. Thus, it will be appreciated that in the example described the discs or flattened pieces are not only covered on the flat surface by a sealing skin but are also sealed at their edge.

The dividing operation to a certain extent destroys cells which have been previously developed in the dough. If the dough is left in the ball or rounded condition for a period of proof, more or less spherical cells will develop uniformly in the mass owing to the fact that there is little or no obstruction to development in any particular direction. The pressure of the flattening operation of the rounded dough pieces has the effect of flattening any cells which have remained in the dough after dividing or which have subsequently developed, to lenticular or bean-like form so that such lie with their longer axis more or less parallel with the plane faces of the flattened piece. The disc- or plaque-forming operation, whether effected by pressure or otherwise, has a definite stretching action upon the dough and this stretching has the effect of producing a tendency in the dough for any further cellular development to take place in the direction of the radial or outward stretching instead of transverse thereto. Consequently, cells substantially developed tend to form in the characteristic lenticular or elongated shape referred to above. This characteristic cellular structure is further encouraged in proving the dough in the tin as the vertical laminated or stacking arrangement causes the development of the cellular structure to be localized or confined longitudinally of the tin in the laminae $e'$, Figure 7, between the series of transverse skins or stretched surfaces the portions of which are indicated in Figure 7 by the lines $e^2$.

A portion of the finished baked loaf is illustrated in Figure 3. The lines $e^2$ depict the outward periphery of the transverse skins lying between the flattened pieces or laminae $e'$ of which the loaf is composed. A slice is represented in dotted lines as having been cut and the quarter section $j$ shows diagrammatically the rounded ovel, bean-like or like somewhat irregular cells $j'$ on the upper surface while the sides of the quarter slice display the flattened or shallow cell structure as at $j^2$.

The invention may be carried out by hand processes or any suitable known apparatus may be employed. For example, a dividing machine may be provided adapted to divide simultaneously a plurality of pieces of the desired size or a dividing machine may be used which is adapted to divide a full weight of dough piece for a loaf. The rounding or balling operation of divided or separate pieces may be carried out in any suitable machine. Proving plant either for an intermediate proof or for the final proof in the tin, may be employed and for flattening the dough pieces or for giving a piece of dough a layer-like or laminated form any appropriate mechanical means may be employed.

Having now described our invention what we claim as new and desire to secure by Letters Patent is:—

1. In the manufacture of tin bread, dividing dough into a series of substantially equal pieces, subjecting the pieces to a rounding operation, flattening the rounded pieces into disc form, assembling the discs on edge in a baking tin and proving and baking the composite dough piece in the tin.

2. In the manufacture of tin bread, dividing dough into a series of substantially equal pieces, subjecting the pieces to a moulding operation to seal the surfaces, flattening the pieces to plaque form, assembling them on edge in a baking tin substantially at right-angles to the longitudinal axis of the tin and proving and baking the composite dough piece in the tin so that a loaf is produced having throughout a cellular structure mainly comprising cells of lenticular or beanlike shape lying substantially in planes at right-angles to the longitudinal axis of the loaf.

3. In the manufacture of tin bread, dividing dough into a series of substantially equal pieces, subjecting the pieces to a balling operation, flattening the balls into disc form, assembling them on edge in a baking tin substantially at right-angles to the longitudinal axis of the tin and proving and baking the composite dough piece in the tin, so that a loaf is produced having throughout a cellular structure mainly comprising lenticular or beanlike cells lying substantially in planes at right-angles to the longitudinal axis of the loaf.

4. In the manufacture of tin bread, subjecting portions of moulded dough to a flattening operation, arranging the flattened dough portions in contiguous relation and on edge in a tin to form a body composed of laminae lying in a series of substantially vertical planes disposed at right-angles to the longitudinal axis of the tin and proving and baking the composite dough piece in the tin so that the cellular structure of each lamina consists mainly of cells of lenticular or beanlike shape having their longer axes substantially in the planes of the laminae.

5. In the manufacture of tin bread, moulding dough to seal the surfaces and subjecting a series of moulded portions to a flattening operation thereby producing plaquelike pieces, filling a tin from end to end with a series of the plaquelike portions arranged on edge in contiguous relation so that the plaques lie in laminae form in substantially vertical planes at right-angles to the longitudinal axis of the tin, and baking the composite laminated body in the tin so that a loaf is produced having throughout a cellular structure mainly comprising cells of lenticular or beanlike shape having their longer axes lying substantially in planes at right-angles to the longitudinal axis of the loaf.

6. In the manufacture of tin bread, forming moulded plaquelike dough portions, arranging such a tin to form substantially vertical laminae lying at right-angles to the longitudinal axis of the tin, each lamina having uncut moulded and sealed surfaces so that the cellular development takes place mainly tranversely and the loaf produced has throughout a consistent cellular structure comprising cells of lenticular or beanlike shape having their longer axes substantially at right-angles to the longitudinal axis of the loaf.

LAURENCE SEYMOUR HARBER.
JOHN EDWARD POINTON.